US009752592B2

(12) United States Patent
Sippel et al.

(10) Patent No.: US 9,752,592 B2
(45) Date of Patent: Sep. 5, 2017

(54) TURBINE SHROUD

(71) Applicants: Rolls-Royce Corporation, Indianapolis, IN (US); Rolls-Royce North American Technologies, Inc., Indianapolis, IN (US)

(72) Inventors: Aaron D. Sippel, Zionsville, IN (US); Ted J. Freeman, Danville, IN (US); Joseph P. Lamusga, Indianapolis, IN (US); David J. Thomas, Brownsburg, IN (US)

(73) Assignees: Rolls-Royce Corporation, Indianapolis, IN (US); Rolls-Royce North American Technologies Inc., Indianapolis, IN (US)

( * ) Notice: Subject to any disclaimer, the term of this patent is extended or adjusted under 35 U.S.C. 154(b) by 587 days.

(21) Appl. No.: 14/094,302

(22) Filed: Dec. 2, 2013

(65) Prior Publication Data
US 2015/0044044 A1 Feb. 12, 2015

Related U.S. Application Data

(60) Provisional application No. 61/758,023, filed on Jan. 29, 2013.

(51) Int. Cl.
*F01D 9/04* (2006.01)
*F01D 11/08* (2006.01)
(Continued)

(52) U.S. Cl.
CPC ............. *F04D 29/522* (2013.01); *F01D 9/04* (2013.01); *F01D 11/08* (2013.01); *F01D 11/18* (2013.01);
(Continued)

(58) Field of Classification Search
CPC . F01D 9/04; F01D 11/08; F01D 11/14; F01D 11/16; F01D 11/18; F01D 25/246;
(Continued)

(56) References Cited

U.S. PATENT DOCUMENTS

| | | | |
|---|---|---|---|
| 3,601,414 A | 8/1971 | Rao | |
| 4,087,199 A * | 5/1978 | Hemsworth | ............ F01D 11/08 415/173.3 |

(Continued)

FOREIGN PATENT DOCUMENTS

| | | |
|---|---|---|
| DE | 102008044450 A1 | 2/2009 |
| EP | 1965030 A2 | 9/2008 |

(Continued)

OTHER PUBLICATIONS

International Search Report and the Written Opinion for International Application No. PCT/US2013/072578, dated Dec. 2, 2013, (11 pages).

(Continued)

*Primary Examiner* — Christopher Verdier
*Assistant Examiner* — Christopher R Legendre
(74) *Attorney, Agent, or Firm* — Barnes & Thornburg LLP

(57) ABSTRACT

A turbine shroud for a gas turbine engine includes an annular metallic carrier, a ceramic blade track, and a cross-key connection formed between the annular metallic carrier and the ceramic blade track. The cross-key connection is formed between the annular metallic carrier and the ceramic blade track to locate the ceramic blade track relative to the annular metallic carrier. The cross-key connection includes a plurality of keys and a plurality of corresponding keyways.

10 Claims, 13 Drawing Sheets

(51) Int. Cl.
*F01D 11/18* (2006.01)
*F01D 25/24* (2006.01)
*F04D 29/52* (2006.01)

(52) U.S. Cl.
CPC ........ *F01D 25/246* (2013.01); *F05D 2230/64* (2013.01); *F05D 2300/6033* (2013.01); *Y02T 50/672* (2013.01); *Y10T 29/49236* (2015.01)

(58) Field of Classification Search
CPC ........... F05D 2230/64; F05D 2230/642; F05D 2240/11
See application file for complete search history.

(56) References Cited

U.S. PATENT DOCUMENTS

| | | | |
|---|---|---|---|
| 4,477,086 A | | 10/1984 | Feder et al. |
| 4,646,810 A | * | 3/1987 | Lardellier ............... B22D 25/00 164/114 |
| 4,679,981 A | * | 7/1987 | Guibert ................... F01D 11/08 415/116 |
| 4,863,345 A | * | 9/1989 | Thompson ............... F01D 11/18 415/134 |
| 5,163,809 A | | 11/1992 | Akgun et al. |
| 5,738,490 A | | 4/1998 | Pizzi |
| 6,142,731 A | * | 11/2000 | Dewis ...................... F01D 11/08 277/416 |
| 6,315,519 B1 | | 11/2001 | Bagepalli et al. |
| 6,517,313 B2 | * | 2/2003 | Rogers ...................... F01D 9/04 415/137 |
| 6,726,448 B2 | | 4/2004 | McGrath et al. |
| 6,733,233 B2 | | 5/2004 | Jasklowski et al. |
| 6,758,386 B2 | | 7/2004 | Marshall et al. |
| 6,758,653 B2 | | 7/2004 | Morrison |
| 6,896,483 B2 | | 5/2005 | Dierksmeier et al. |
| 6,910,853 B2 | | 6/2005 | Corman et al. |
| 7,090,459 B2 | | 8/2006 | Bhate et al. |
| 7,195,452 B2 | | 3/2007 | Allan et al. |
| 7,217,089 B2 | | 5/2007 | Durocher et al. |
| 7,234,306 B2 | | 6/2007 | Aumont et al. |
| 7,374,396 B2 | | 5/2008 | Martin et al. |
| 7,435,049 B2 | | 10/2008 | Ghasripoor et al. |
| 7,641,442 B2 | * | 1/2010 | Denece ................... F01D 11/24 415/173.1 |
| 7,665,960 B2 | | 2/2010 | Shi et al. |
| 7,686,575 B2 | * | 3/2010 | Chehab ................... F01D 11/18 29/889.22 |
| 7,771,160 B2 | | 8/2010 | Shi et al. |
| 7,914,256 B2 | | 3/2011 | Xie et al. |
| 7,988,395 B2 | | 8/2011 | Steffier |
| 8,047,773 B2 | | 11/2011 | Bruce et al. |
| 8,061,977 B2 | | 11/2011 | Keller et al. |
| 8,079,807 B2 | * | 12/2011 | Shapiro .................. F01D 11/12 415/173.1 |
| 8,092,160 B2 | | 1/2012 | Shi et al. |
| 8,167,546 B2 | | 5/2012 | Shi et al. |
| 8,235,670 B2 | | 8/2012 | Morrison et al. |
| 8,257,029 B2 | | 9/2012 | Habarou et al. |
| 8,322,983 B2 | | 12/2012 | Marini |
| 8,328,505 B2 | | 12/2012 | Shi et al. |
| 8,496,431 B2 | | 7/2013 | Habarou et al. |
| 8,511,975 B2 | * | 8/2013 | Shi ......................... F01D 25/246 415/173.1 |
| 8,555,647 B2 | | 10/2013 | Dimascio et al. |
| 8,568,091 B2 | * | 10/2013 | McCaffrey ............. F01D 11/125 415/173.3 |
| 8,651,497 B2 | | 2/2014 | Tholen et al. |
| 8,684,689 B2 | | 4/2014 | Guo et al. |
| 8,739,547 B2 | | 6/2014 | Jarmon et al. |
| 8,740,552 B2 | * | 6/2014 | Marusko ................... F01D 9/04 415/173.1 |
| 8,770,931 B2 | | 7/2014 | Alvanos et al. |
| 8,784,052 B2 | | 7/2014 | Shi et al. |
| 8,790,067 B2 | | 7/2014 | McCaffrey et al. |
| 8,801,372 B2 | | 8/2014 | Shi et al. |
| 8,814,173 B2 | | 8/2014 | Motzkus et al. |
| 8,834,106 B2 | | 9/2014 | Luczak |
| 8,926,270 B2 | | 1/2015 | Karafillis et al. |
| 9,011,079 B2 | | 4/2015 | Coign et al. |
| 9,062,551 B2 | * | 6/2015 | Simonet .................. F01D 9/041 |
| 2004/0047726 A1 | | 3/2004 | Morrison |
| 2009/0208322 A1 | | 8/2009 | McCaffrey |
| 2010/0111678 A1 | * | 5/2010 | Habarou .................. F01D 9/04 415/173.3 |
| 2010/0150703 A1 | | 6/2010 | Gonzalez et al. |
| 2010/0232941 A1 | | 9/2010 | Smoke et al. |
| 2011/0052384 A1 | | 3/2011 | Shi et al. |
| 2011/0057394 A1 | | 3/2011 | Halling |
| 2011/0150635 A1 | | 6/2011 | Motzkus et al. |
| 2011/0274538 A1 | | 11/2011 | Shi et al. |
| 2012/0070276 A1 | | 3/2012 | Shi et al. |
| 2012/0107107 A1 | | 5/2012 | Chan et al. |
| 2012/0156029 A1 | | 6/2012 | Karafillis et al. |
| 2012/0177488 A1 | | 7/2012 | Corman |
| 2012/0247124 A1 | | 10/2012 | Shapiro et al. |
| 2012/0263582 A1 | | 10/2012 | Foster et al. |
| 2012/0301269 A1 | | 11/2012 | Alvanos et al. |
| 2012/0301303 A1 | | 11/2012 | Alvanos et al. |
| 2012/0301312 A1 | | 11/2012 | Berczik et al. |
| 2012/0308367 A1 | | 12/2012 | Luczak et al. |
| 2013/0008176 A1 | | 1/2013 | Shi et al. |
| 2013/0011248 A1 | | 1/2013 | Croteau et al. |
| 2013/0177384 A1 | | 7/2013 | Coign et al. |
| 2013/0177411 A1 | | 7/2013 | Weber et al. |
| 2014/0202168 A1 | | 7/2014 | Shapiro et al. |
| 2014/0260320 A1 | | 9/2014 | Graves et al. |
| 2014/0271144 A1 | * | 9/2014 | Landwehr ............... F01D 11/08 415/173.1 |
| 2015/0044044 A1 | * | 2/2015 | Sippel ...................... F01D 9/04 415/220 |
| 2016/0123171 A1 | * | 5/2016 | Westphal ............... F01D 11/08 415/173.1 |
| 2016/0177786 A1 | | 6/2016 | Sippel et al. |
| 2016/0208635 A1 | | 7/2016 | Vetters et al. |
| 2016/0222812 A1 | | 8/2016 | Sippel et al. |

FOREIGN PATENT DOCUMENTS

| | | |
|---|---|---|
| EP | 2589774 A1 | 5/2013 |
| EP | 2604805 A2 | 6/2013 |
| FR | 2580033 A1 | 10/1986 |
| GB | 2235730 A | 3/1991 |
| GB | 2468768 A | 9/2010 |
| GB | 2480766 A | 11/2011 |
| JP | 09250304 A * | 9/1997 |
| JP | 09264104 A * | 10/1997 |
| WO | 2010058137 A1 | 5/2010 |
| WO | 2011157956 A1 | 12/2011 |
| WO | 2014120334 A1 | 8/2014 |
| WO | 2014143225 A1 | 9/2014 |
| WO | 2014163674 A1 | 10/2014 |

OTHER PUBLICATIONS

Corman, Gregory S. and Luthra, Krishan L.; Melt Infiltrated Ceramic Composites (HIPERCOMP®) for Gas Turbine Engine Applications; DOE/CE/41000-3; May 1994-Sep. 2005; pp. 1-507.
Bloxer, Matt L; Thermal Stress in High Temperature Cylindrical Fasteners; NASA Technical Memorandum; May 1988; pp. 1-12.
Bloxer, Matt Land McWithey, Robert R.; Theoretical Basis for Design of Thermal-Stress-Free Fasteners; NASA Technical Paper; Dec. 1983; pp. 1-26.

* cited by examiner

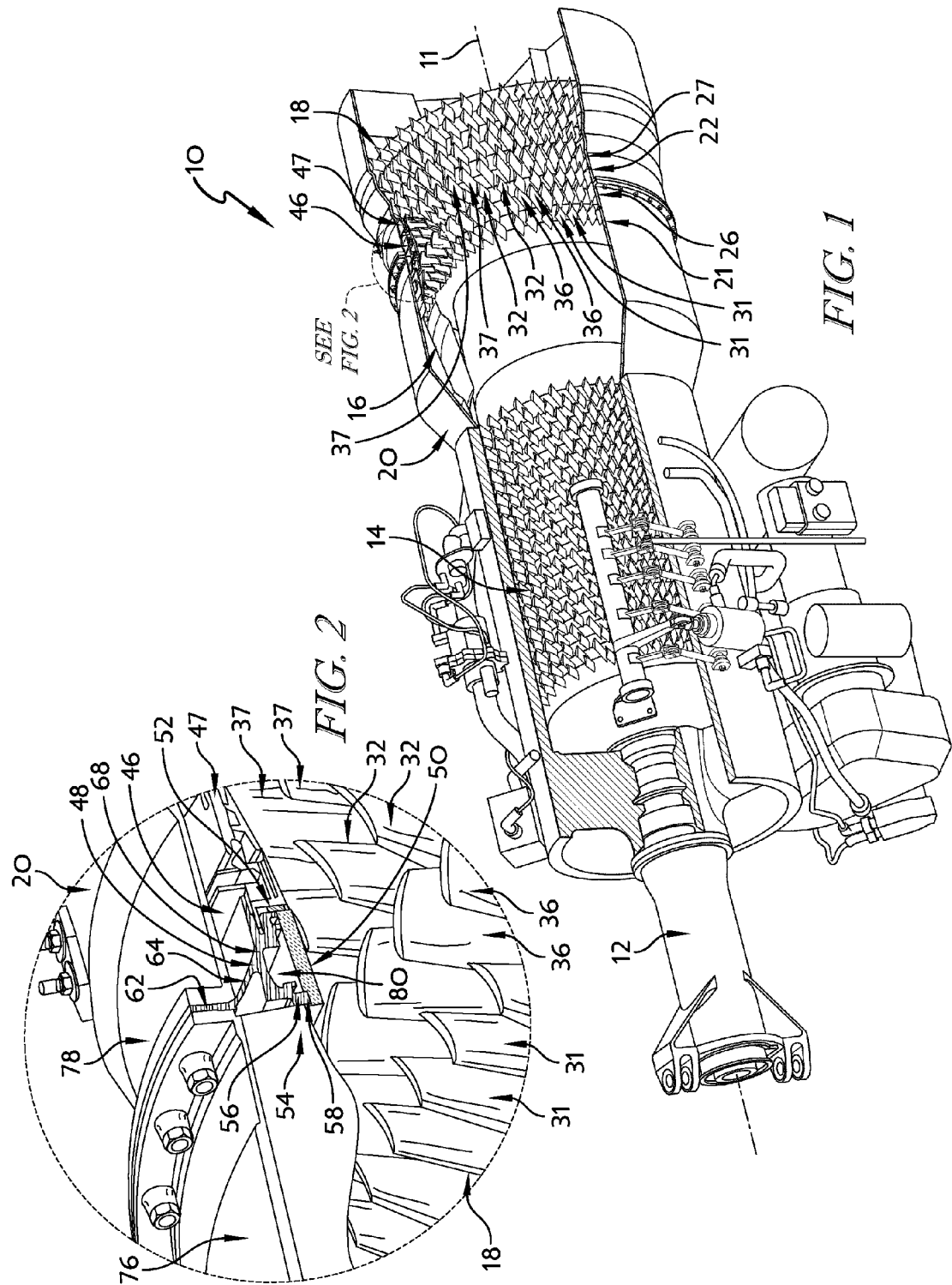

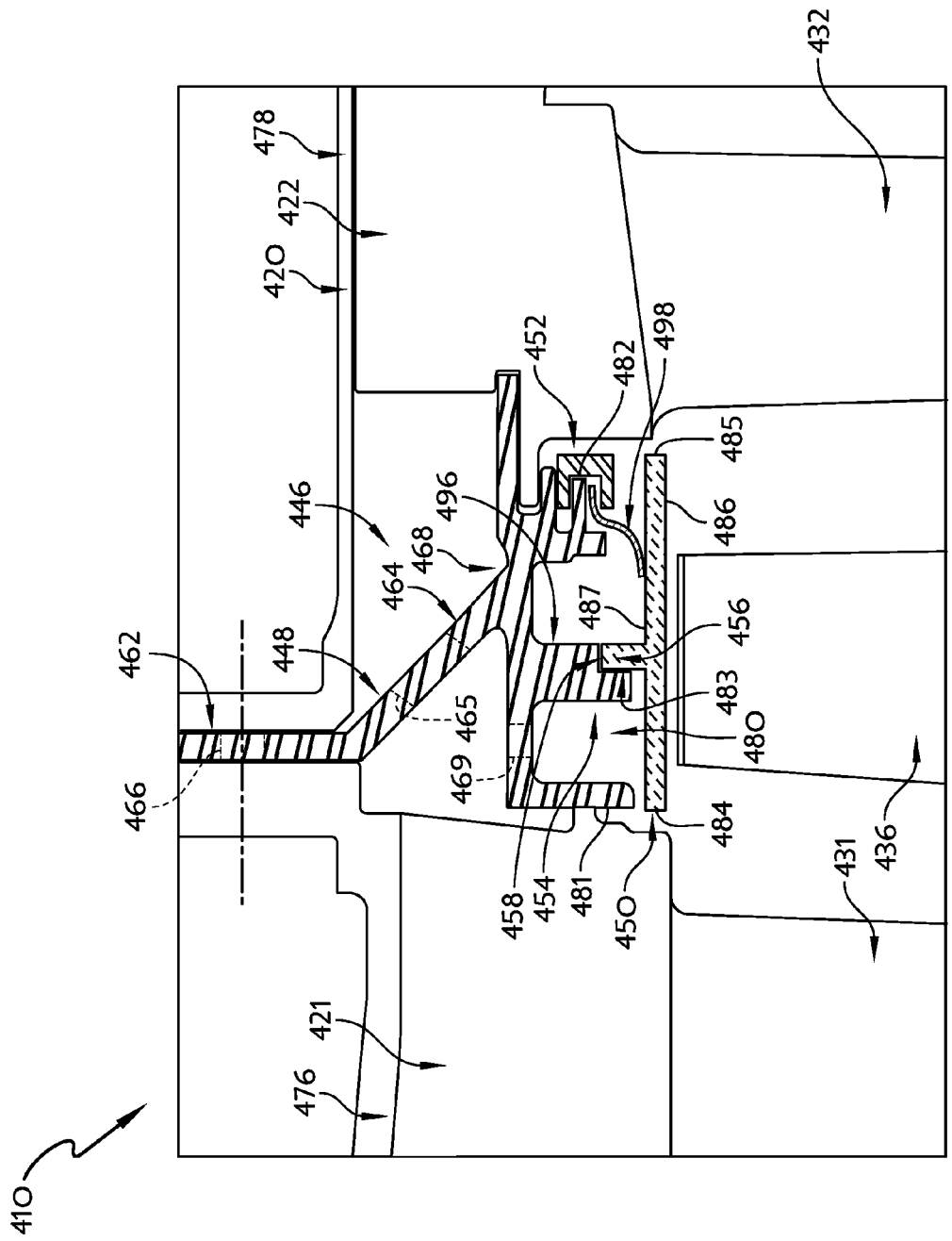

TURBINE SHROUD

CROSS REFERENCE TO RELATED APPLICATIONS

This application claims priority to and the benefit of U.S. Provisional Patent Application No. 61/758,023, filed 29 Jan. 2013, the disclosure of which is now incorporated herein by reference.

FIELD OF THE DISCLOSURE

The present disclosure relates generally to gas turbine engines, and more specifically to turbine shrouds used in gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Compressors and turbines typically include alternating stages of static vane assemblies and rotating wheel assemblies. The rotating wheel assemblies include disks carrying blades around their outer edges. When the rotating wheel assemblies turn, tips of the blades move along blade tracks included in static shrouds that are arranged around the rotating wheel assemblies. Such static shrouds may be coupled to an engine case that surrounds the compressor, the combustor, and the turbine.

Some shrouds positioned in the turbine may be exposed to high temperatures from products of the combustion reaction in the combustor. Such shrouds sometimes include components made from materials that have different coefficients of thermal expansion. Due to the differing coefficients of thermal expansion, the components of some turbine shrouds expand at different rates when exposed to combustion products. For example, coupling such components with traditional fasteners such as rivets or bolts may not allow for the differing levels of expansion and contraction during operation of the gas turbine engine.

SUMMARY

A turbine shroud for use in the turbine section of a gas turbine engine is disclosed in this paper. The turbine shroud is adapted to extend around a rotatable turbine wheel assembly having a wheel and blades. The turbine shroud blocks hot gasses flowing through the turbine section from passing over the blades without pushing the blades. By ensuring that the hot gasses push the blades, the turbine shroud helps cause the turbine wheel assembly to rotate when hot gasses are driven through the turbine section from a combustion section of the gas turbine engine. Rotation of the turbine wheel assembly can then be used to drive a compressor, a fan, a propeller, a generator, or other modules coupled to the turbine wheel assembly.

In illustrative embodiments, the turbine shroud disclosed includes an annular metallic carrier and a one-piece ceramic blade track. The annular metallic carrier is adapted to be coupled to other metallic components of the turbine section to hold the turbine shroud in place relative to the rest of the turbine section. The one-piece ceramic blade track is illustratively made from a ceramic matrix composite material adapted to withstand high temperatures and is arranged between the annular metallic carrier and the turbine wheel assembly. The arrangement of the one-piece ceramic blade track insulates the annular metallic carrier from the hot gasses directed at the blades of the turbine wheel assembly.

In illustrative embodiments, the turbine shroud includes a cross-key connection formed between the annular metallic carrier and the one-piece ceramic blade track. The cross-key connection locates the one-piece ceramic blade track relative to the annular metallic carrier while allowing the annular metallic carrier and the one-piece ceramic blade track to expand and contract at different rates based on temperature.

In illustrative embodiments, the cross-key connection includes a plurality of keys and a plurality of corresponding keyways that receive the keys. The plurality of keys extend in a radial direction from the annular metallic carrier or from the one-piece ceramic blade track. The plurality of corresponding keyways are formed to extend in the radial direction into the other of the annular metallic carrier or the one-piece ceramic blade track.

These and other features of the present disclosure will become more apparent from the following description of the illustrative embodiments.

BRIEF DESCRIPTION OF THE DRAWINGS

FIG. 1 is a cut-away perspective view of a gas turbine engine;

FIG. 2 is a detail view of FIG. 1 showing a turbine shroud providing a track for blades of a turbine wheel assembly;

FIG. 10 is a partial cross-sectional view of a gas turbine engine showing the arrangement of the turbine shroud of FIG. 9 in the gas turbine engine.

DETAILED DESCRIPTION OF THE DRAWINGS

Figure 3:
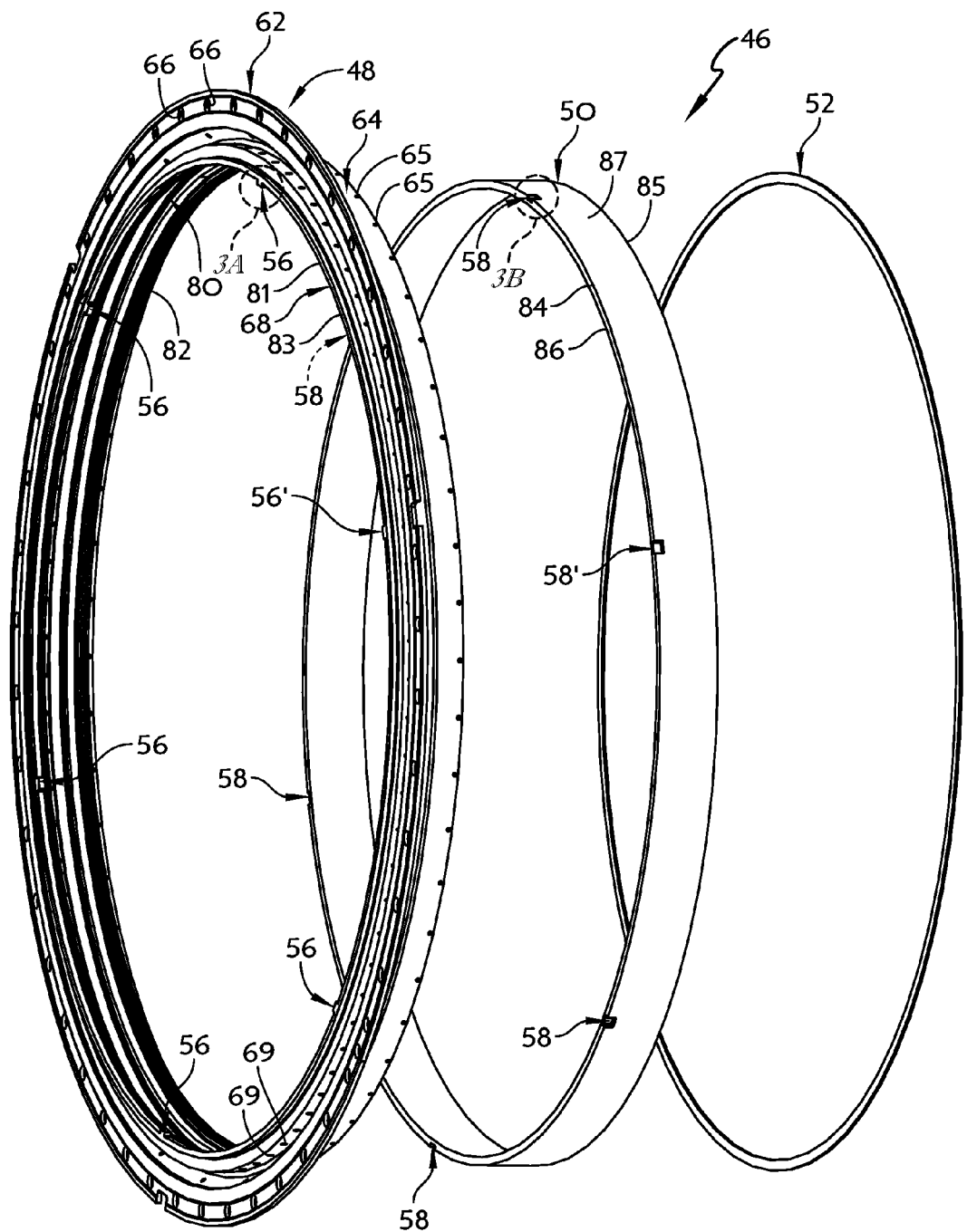
FIG. 3 is an exploded perspective view of the turbine shroud included in the gas turbine engine shown in FIGS. 1 and 2 showing that the turbine shroud includes a carrier, a blade track, and a retainer.
Figure 3A:
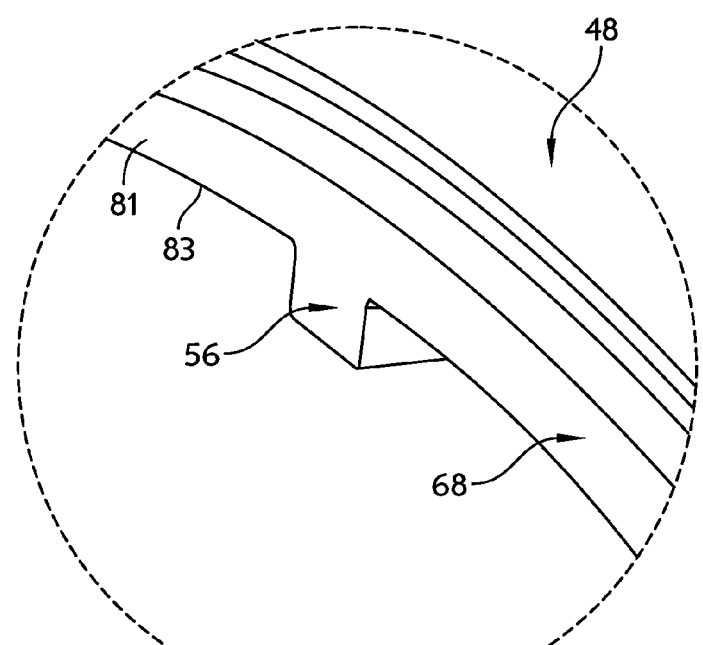
FIG. 3A is a detail perspective view of the carrier included in the turbine shroud shown in FIG. 3.
Figure 3B:
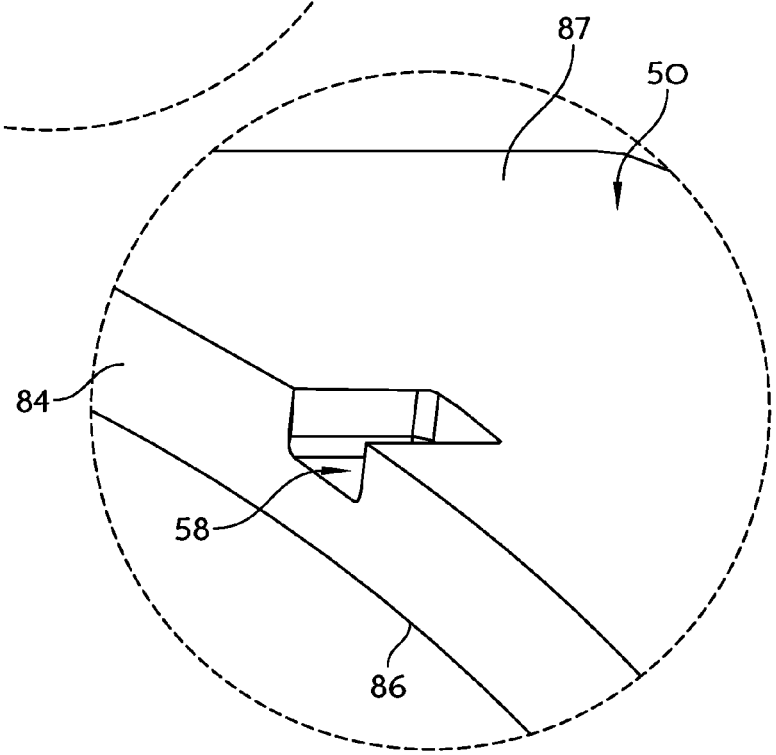
FIG. 3B is a detail perspective view of the blade track included in the turbine shroud of FIG. 3.

For the purposes of promoting an understanding of the principles of the disclosure, reference will now be made to a number of illustrative embodiments illustrated in the drawings and specific language will be used to describe the same.

FIG. 1 is an illustrative aerospace gas turbine engine 10 cut-away to show that the engine 10 includes an output shaft 12, a compressor 14, a combustor 16, and a turbine 18 all mounted to a case 20. The output shaft 12 is configured to be coupled to a propeller (not shown) and is driven by the turbine 18. The compressor 14 is configured compress and deliver air to the combustor 16. The combustor 16 is configured to mix fuel with the compressed air received from the compressor 14 and to ignite the fuel. The hot high pressure products of the combustion reaction in the combustor 16 are directed into the turbine 18 and the turbine 18 extracts work to drive the compressor 14 and the output shaft 12.

The turbine 18 illustratively includes static turbine vane assemblies 21, 22, etc. and corresponding turbine wheel assemblies 26, 27, etc. as shown in FIG. 1. Each vane assembly 21, 22, etc. includes a plurality corresponding of vanes 31, 32, etc. and each turbine wheel assembly 26, 27, etc. includes a plurality of corresponding blades 36, 37, etc. The vanes 31, 32, etc. of the vane assemblies 21, 22, etc. extend across the flow path of the hot, high-pressure combustion products from the combustor 16 to direct the combustion products toward the blades 36, 37, etc. of the turbine wheel assemblies 26, 27, etc. The blades 36, 37, etc. are in turn pushed by the combustion products to cause the turbine wheel assemblies 26, 27, etc. to rotate; thereby, driving the rotating components of the compressor 14 and the output shaft 12.

The turbine 18 also includes a plurality of turbine shrouds 46, 47, etc. that extend around each turbine wheel assembly 26, 27, etc. to block combustion products from passing over the blades 36, 37, etc. without pushing the blades 36, 37, etc. to rotate. An exemplary first stage turbine shroud 46, shown in FIG. 2, extends around a first stage turbine wheel assembly 26 and is sized to block most combustion products from passing over the blades 36 without pushing the blades 36 to rotate as suggested in FIG. 4. Combustion products that are allowed to pass over the blades 36 do not push the blades 36 and such passed-over products contribute to lost performance within the engine 10.

The turbine shroud 46 illustratively includes a carrier 48, a blade track (sometimes called seal ring) 50, and a retainer 52 as shown in FIGS. 2 and 3. The carrier 48 is an annular, round metallic component and is configured to support the blade track 50 in position adjacent to the blades 36 of the turbine wheel assembly 26. The illustrative blade track 50 is concentric with and nested into the carrier 48 along a rotational axis 11 of the engine 10. The retainer 52 engages both the carrier 48 and the blade track 50 to position the carrier 48 and the blade track relative to other static turbine components.

In the illustrative embodiment, the carrier 48 and the retainer 52 are made from a nickel alloy. More particularly, the carrier 48 and the retainer 52 are made from a cast nickel alloy. In other embodiments, the carrier 48 and/or the retainer 52 may be made from cobalt alloys, other metallic alloys, non-metallic materials, or composite materials.

In the illustrative embodiment, the blade track 50 is made from a ceramic material; and, more particularly, a ceramic matrix composite (CMC). Even more particularly, the illustrative blade track 50 is made from a SiC—SiC ceramic matrix composite including a silicon carbide matrix and silicon carbide fibers. For purposes of this application, a ceramic material is any monolithic ceramic or composite in which at least one constituent is a ceramic. In other embodiments, the blade track 50 may be made of other metallic, non-metallic, or composite materials with low coefficients of thermal expansion.

Unlike some other blade tracks, the blade track 50 has a relatively low coefficient of thermal expansion because the blade track 50 is made from ceramic materials. Considering this relatively small coefficient of thermal expansion, the blade track 50 can be designed to maintain a small gap between the blade track 50 and the blades 36 thereby improving performance of the engine 10.

Additionally, the blade track 50 is a unitary component forming a full hoop as shown in FIG. 3. The blade track 50 is a component of one-piece, continuous construction, rather than as a series of joined segments. This construction eliminates gaps that may be formed between parts of a multi-piece (or segmented) blade track. The one-piece full hoop of the blade track 50 encourages uniform radial expansion of the blade track 50 at high temperatures. Uniform radial expansion of the blade track 50 allows the blade track 50 to remain round at high temperatures which results in the ability to further maintain a small gap between the blades 36 and the blade track 50 while hot combustion products are being directed over the blades 36 and the blade track 50.

Figure 4:
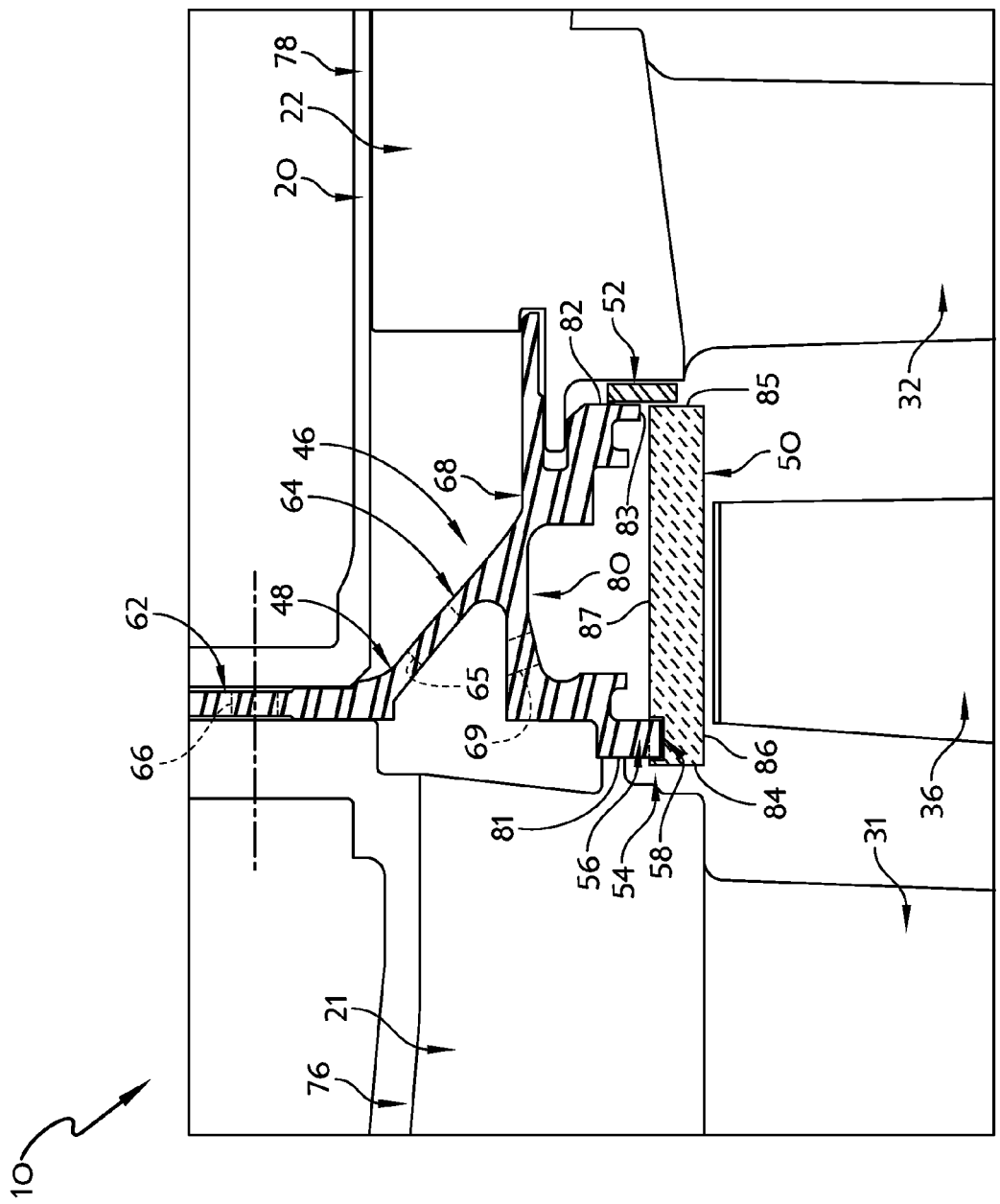
FIG. 4 is a partial cross-sectional view of the gas turbine engine of FIG. 1 showing the arrangement of the turbine shroud in the gas turbine engine.

To accommodate the connection of the CMC blade track 50 to the metallic carrier 48 (which has a relatively high coefficient of thermal expansion the turbine shroud 46 includes a cross-key connection 54 that is formed between the carrier 48 and the blade track 50 as shown, for example, in FIGS. 2 and 4. The cross-key connection 54 locates the blade track 50 relative to the carrier 48 while allowing radial translation of the blade track 50 relative to the carrier 48. The cross-key connection 54 illustratively includes a plurality of keys 56 and a plurality of corresponding keyways 58 sized and arranged to receive the plurality of keys 56.

In the illustrative embodiment, there are six corresponding pairs of keys 56 and keyways 58 as shown in FIG. 3. Each paired key 56 and keyways 58 is spaced equally around the first stage turbine shroud 46, except for a locator pair 56', 58' that are offset by about two degrees to locate the blade track 50 relative to the retainer 52. In other embodiments, other numbers of paired keys 56 and keyways 58 may be used.

In the illustrative embodiment, the keys 56 are integrally coupled to (monolithic with) the carrier 48 and are arranged to extend inwardly in the radial direction from the carrier 48. In other embodiments, the keys may be coupled to the carrier 48 via a bond, weld, pin, threading, or other suitable connection. In still other embodiments, the keys may be free floating relative to the carrier 48 and the blade track 50. The keyways 58 are formed in the blade track 50 and extend inwardly in the radial direction into the blade track 50.

Referring now to FIGS. 3 and 4, the carrier 48 is illustratively formed to include a connection flange 62, a connector 64, and a support band 68. The connection flange 62 is formed to include a bolt-hole pattern 66 adapted to be bolted between a combustor-case section 76 and a turbine-case section 78 included in the case 20. In another embodiment, the connection flange 62 could be hung from the case rather than bolted. The connector 64 extends inwardly in the radial direction and rearwardly in an axial direction from the connection flange 62 to form a frustoconical shape. The support band 68 extends inwardly in the radial direction from the connector 64 and the connection flange 62.

The support band 68 forms a downwardly-opening channel 80 that faces the blade track 50 as shown in FIG. 4. The downwardly-opening channel 80 is exposed to fluid communication with air radially outwardly of the blade track 50 via a vent hole pattern 69 formed in the support band 68 and a vent hole pattern 65 formed in the connector 64. The support band also has a forward side 81, an aft side 82, an inner surface 83. The forward side 81 faces the combustor 16 and contacts the first stage vane assembly 21 to locate the blade track 50 relative to the first stage vane assembly 21. The aft side 82 faces away from the combustor 16. The inner surface 83 faces inwardly in the radial direction toward the blade track 50 and the engine axis 11. In the illustrative embodiment, the plurality of keys 56 extend radially inwardly from the support band 68 and extend rearwardly in the axial direction from the forward side 81 of the support band 68 toward the aft side 82 of the support band 68.

In the illustrative embodiment, blade track 50 has a forward side 84, an aft side 85, an inner surface 86, and an outer surface 87 as shown in FIG. 4. The forward side 84 faces the combustor 16 and the aft side 85 faces away from the combustor 16. The inner surface 86 faces the engine axis 11 and the outer surface faces away from the engine axis 11. In the illustrative embodiment, the inner surface 86 has a cylindrical shape as shown in FIG. 4. In other embodiments, the inner surface 86 may have a conical shape. The blade track 50 has a uniform thickness between inner surface 86 and the outer surface 87 as shown, for example, in FIG. 3.

The keyways 58 extend into the blade track 50 in an axial direction from the forward side 84 toward the aft side 85 and from the outer surface 87 toward the inner surface 86 as shown, for example, in FIG. 4. The illustrative keyways 58 extend only partway from the outer surface 87 toward the inner surface 86 as shown in FIG. 4. In other embodiments, the keyways 58 may extend all the way through the blade track 50 from the outer surface 87 to the inner surface 86 forming slots in the blade track 50.

The retainer 52 is an annular metallic ring with a linear cross section as shown in FIGS. 3 and 4. The retainer 52 engages the aft side 82 of the support band 68 and the aft side 85 of the blade track 50 to locate the carrier 48 and the blade track 50 relative to the second stage vane assembly 22 as shown in FIG. 4. In other embodiments, the retainer 52 may be a non-metallic or ceramic component.

According to at least one method of locating the blade track 50 relative to the retainer 48, a user rotates the blade track 50 to a predetermined orientation relative to the retainer 48 so that the keys 56, spaced an equal distance from other keys 56, are aligned with corresponding keyways 58 and so that the off-set key 56', spaced a different distance from other keys 56, is aligned with corresponding keyway 58'. Then the user nests the blade track 50 into the retainer 48 so that the blade track 50 is concentric with the retainer. Next, the user inserts the keys 56, 56' of the carrier 48 into the corresponding keyways 58, 58' formed in the blade track 50 to thereby establish the cross-key connection 54 between the blade track 50 and the carrier 48.

Figure 5:
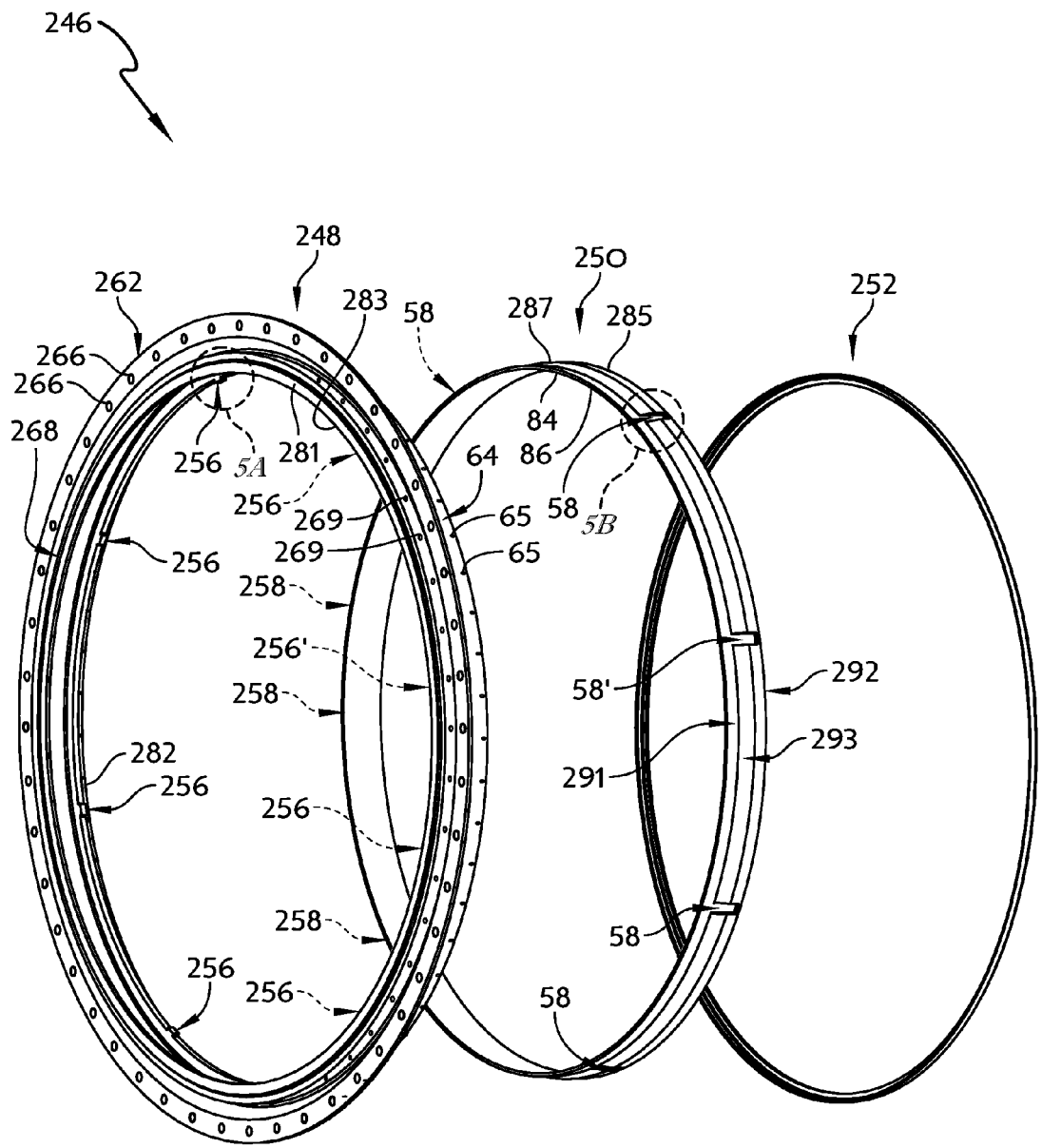
FIG. 5 is an exploded perspective view of another turbine shroud for use in a gas turbine engine showing that the turbine shroud includes a carrier, a blade track, and a retainer.
Figure 6:
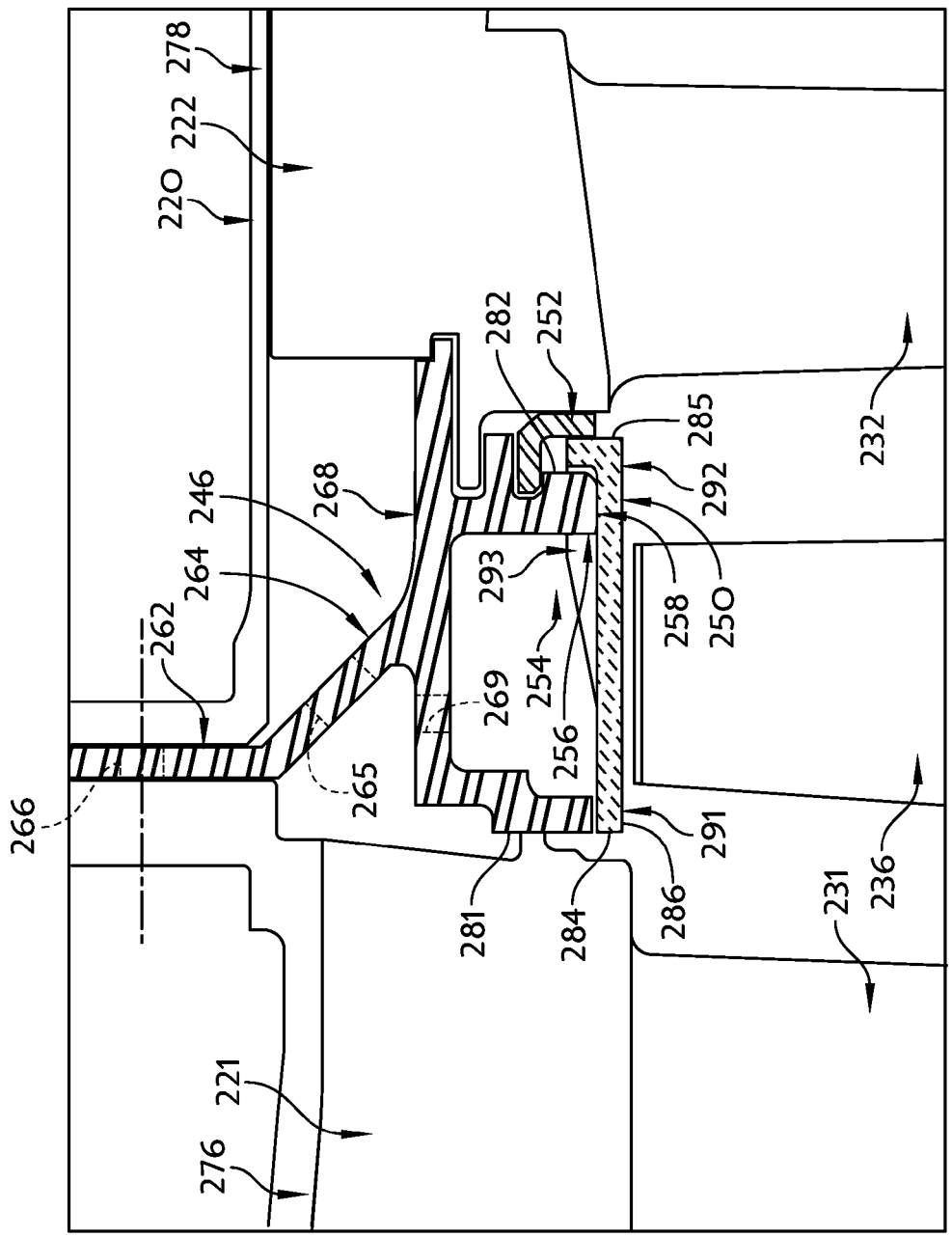
FIG. 6 is a partial cross-sectional view of a gas turbine engine showing the arrangement of the turbine shroud of FIG. 5 in the gas turbine engine.

Another illustrative turbine shroud 246 is shown in FIGS. 5-6. The turbine shroud 246 is configured for use in engine 10 and is substantially similar to the turbine shroud 46 shown in FIGS. 1-4 and described herein. Accordingly, similar reference numbers in the 200 series indicate features that are common between the turbine shroud 46 and the turbine shroud 246. The description of the engine 10 and the turbine shroud 46 is hereby incorporated by reference to apply to the turbine shroud 246, except in instances when it conflicts with the specific description and drawings of the turbine shroud 246.

Figure 5A:
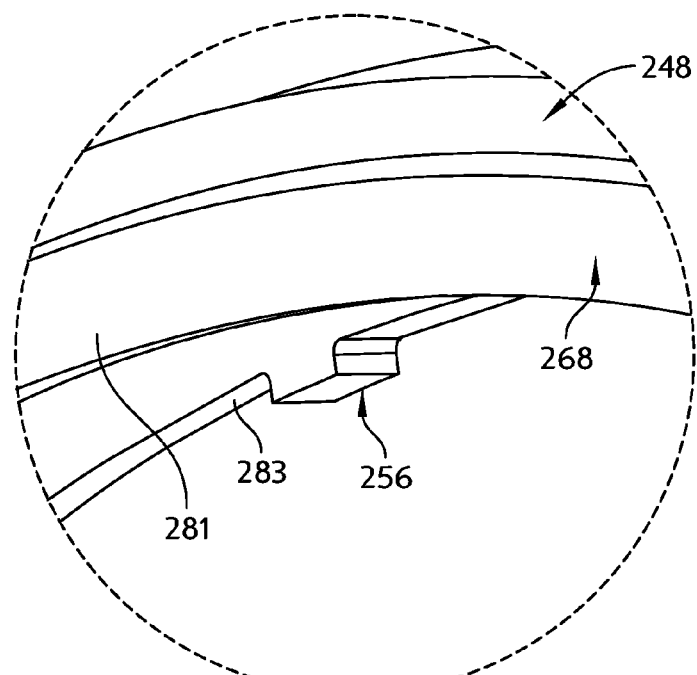
FIG. 5A is a detail perspective view of the carrier included in the turbine shroud shown in FIG. 5.

Unlike the turbine shroud 46, the cross-key connection 254 includes eight paired keys 56 and keyways 58 as shown in FIG. 5. The keys 256 of the cross-key connection 254 are coupled at a different location to the carrier 248 as shown in FIGS. 5, 5A, and 6. Specifically, the keys 256 extend radially inwardly from the support band 268 and extend forwardly in the axial direction from the aft side 282 of the support band 268 toward the forward side 282 of the support band 268 as shown in FIG. 6.

Figure 5B:
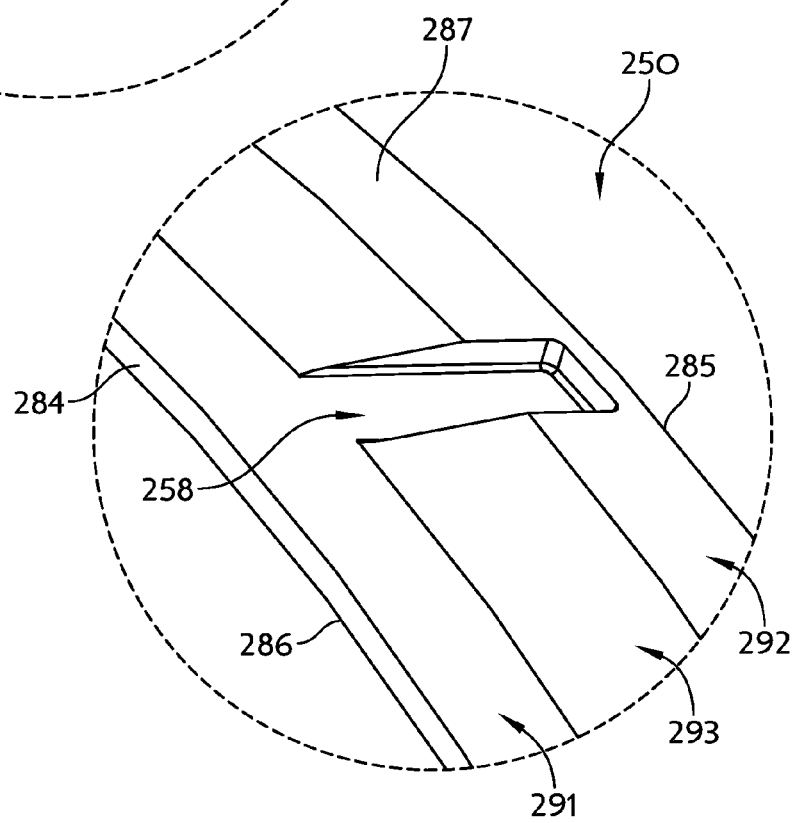
FIG. 5B is a detail perspective view of the blade track included in the turbine shroud of FIG. 5.

Further, the blade track 250 includes a forward portion 291 having a first thickness, an aft portion having a second thickness 292, and a ramp portion 293 having an increasing thickness that interconnects the forward and the aft portions 291, 292 as shown in FIGS. 5B and 6. In the illustrative embodiment, the second thickness of the aft portion 292 is greater than the first thickness of the forward portion 291. The keyways 258 of the cross-key connection 254 extend inwardly in the radial direction into the aft portion 292 and into the ramp portion 293 as shown in FIG. 5B. However, the keyways 258 of the cross-key connection 254 are spaced apart from the aft side 285 of the blade track 250.

Additionally, the retainer 252 of the turbine shroud 246 has a different cross-sectional shape than the retainer 52 of the turbine shroud 46. Specifically, the retainer 252 has an L-shaped cross-section as shown in FIG. 6.

Figure 7:
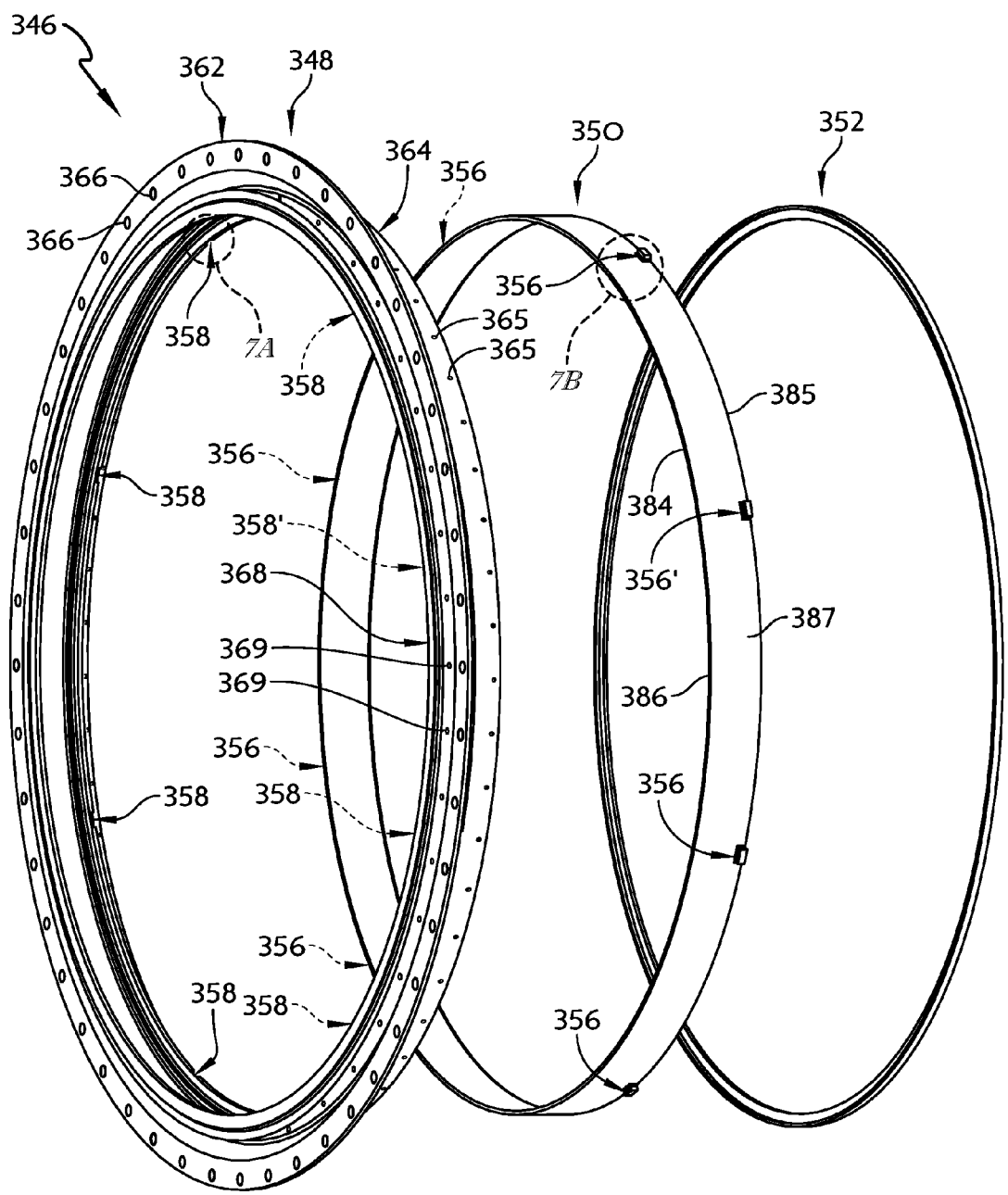
FIG. 7 is an exploded perspective view of another turbine shroud for use in a gas turbine engine showing that the turbine shroud includes a carrier, a blade track, and a retainer.
Figure 8:
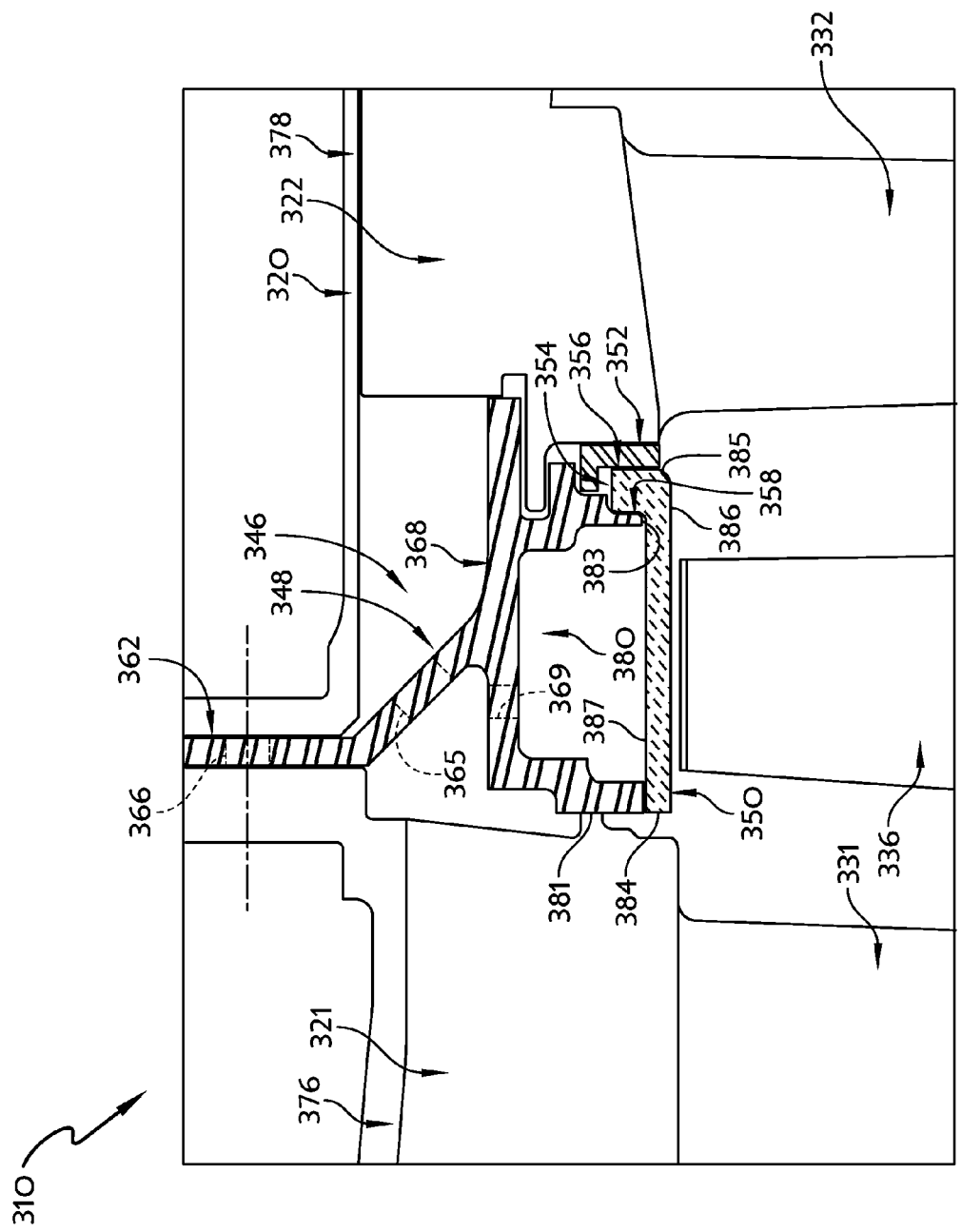
FIG. 8 is a partial cross-sectional view of a gas turbine engine showing the arrangement of the turbine shroud of FIG. 7 in the gas turbine engine.

Another illustrative turbine shroud 346 is shown in FIGS. 7-8. The turbine shroud 346 is configured for use in engine 10 and is substantially similar to the turbine shroud 46 shown in FIGS. 1-4 and described herein. Accordingly, similar reference numbers in the 300 series indicate features that are common between the turbine shroud 46 and the turbine shroud 346. The description of the engine 10 and the turbine shroud 46 is hereby incorporated by reference to apply to the turbine shroud 346, except in instances when it conflicts with the specific description and drawings of the turbine shroud 346.

Unlike the turbine shroud 46, the cross-key connection 354 includes eight paired keys 356 and keyways 358 as shown in FIG. 7. The keys 356 of the cross-key connection 354 are coupled to the blade track 350 as shown in FIGS. 7, 7B, and 8. Specifically, the keys 356 extend outwardly in the radial direction from the blade track 350. In the illustrative embodiment, the keys 356 are integrally manufactured with the blade track 350 such that the keys 356 and the blade track 350 form a monolithic component. In other embodiments, the keys may be floating, bonded, or co-processed with the blade track 350. Also, the keys 356 are arranged along the aft side 385 of the blade track 350 and extend toward the front side 384 of the blade track 350 as shown in FIGS. 7B and 8.

Figure 7A:
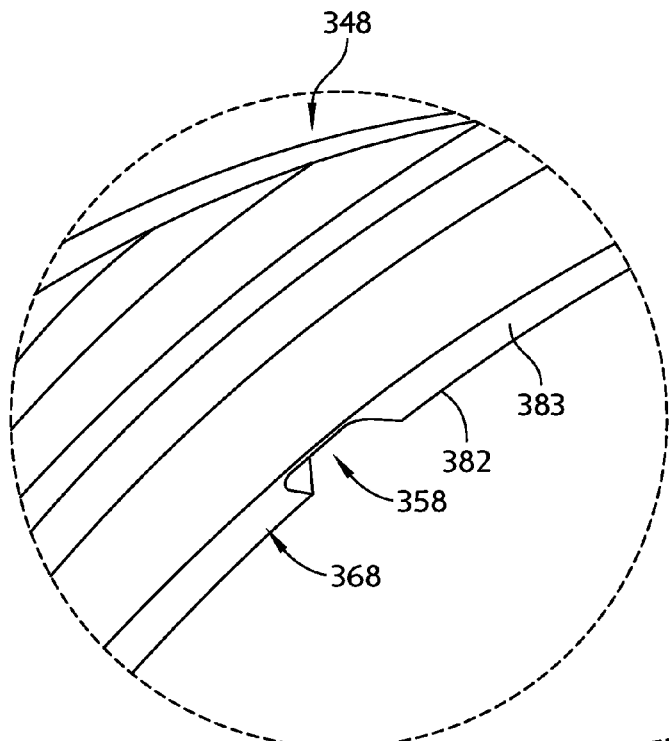
FIG. 7A is a detail perspective view of the carrier included in the turbine shroud shown in FIG. 7.
Figure 7B:
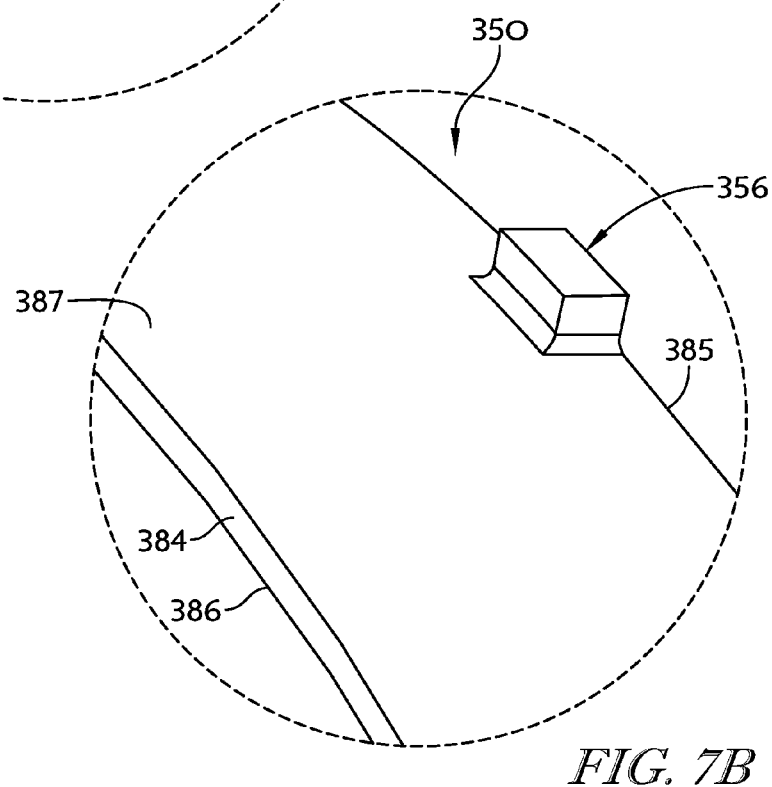
FIG. 7B is a detail perspective view of the blade track included in the turbine shroud of FIG. 7.

Further, the keyways 358 of the cross-key connection 354 are formed in the retainer 352 as shown in FIGS. 7A and 8. The keyways 358 extend outwardly in the radial direction into the carrier 348 from the inner surface 383 of the carrier 348. Additionally, the keyways 358 extend forwardly in the axial direction into the carrier 348 from the aft side 382 of the carrier 348 as shown in FIG. 8.

Additionally, the retainer 352 of the turbine shroud 346 has a different cross-sectional shape than the retainer 52 of the turbine shroud 46. Specifically, the retainer 352 has an L-shaped cross-section as shown in FIG. 8.

Figure 9:
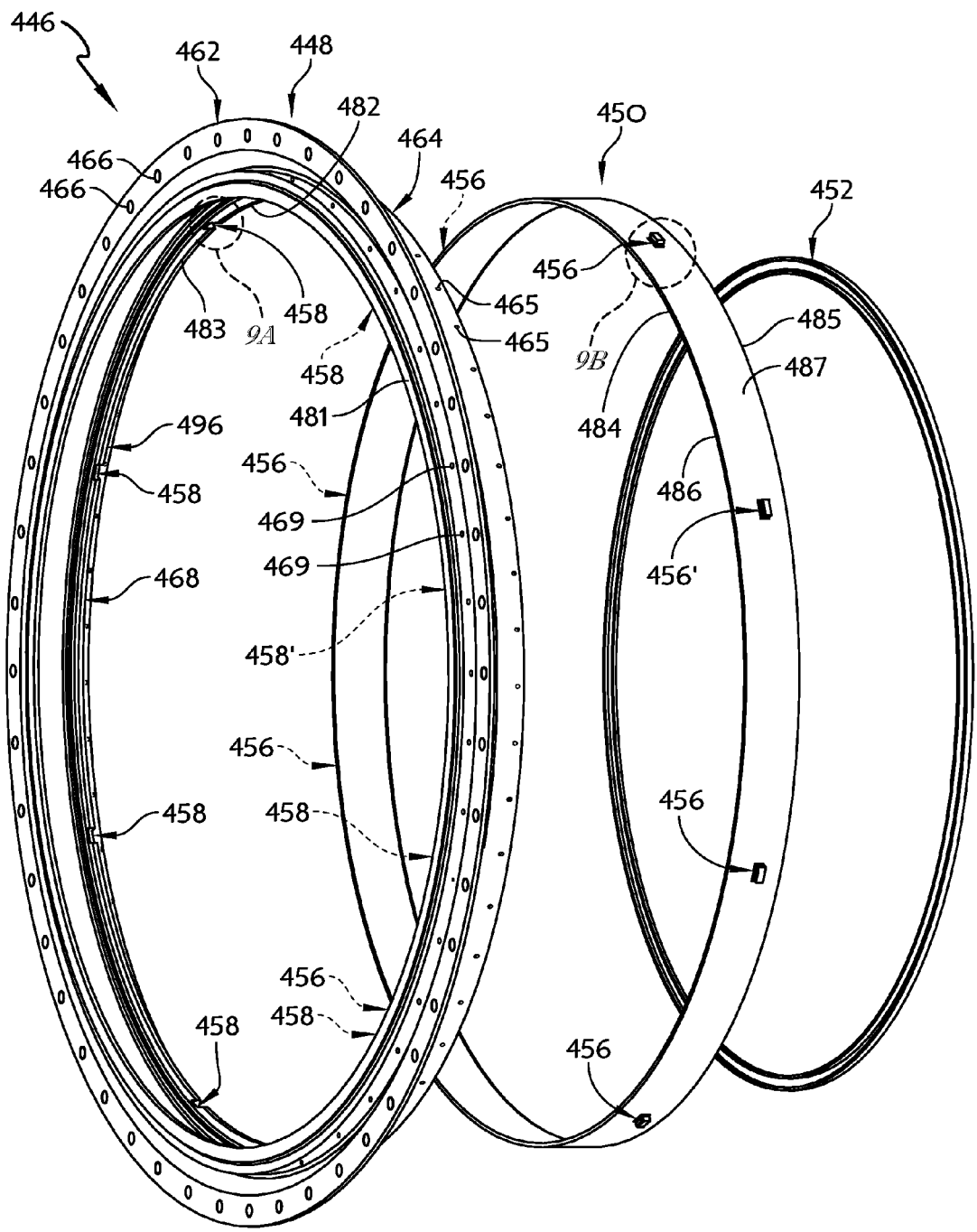
FIG. 9 is an exploded perspective view of yet another turbine shroud for use in a gas turbine engine showing that the turbine shroud includes a carrier, a blade track, and a retainer.

Yet another illustrative turbine shroud 446 is shown in FIGS. 8-9. The turbine shroud 446 is configured for use in engine 10 and is substantially similar to the turbine shroud 46 shown in FIGS. 1-4 and described herein. Accordingly, similar reference numbers in the 400 series indicate features that are common between the turbine shroud 46 and the turbine shroud 446. The description of the engine 10 and the turbine shroud 46 is hereby incorporated by reference to apply to the turbine shroud 446, except in instances when it conflicts with the specific description and drawings of the turbine shroud 446.

Unlike the turbine shroud 46, the cross-key connection 254 includes eight paired keys 56 and keyways 58 as shown in FIG. 9. The keys 456 of the cross-key connection 454 are coupled to the blade track 450 as shown in FIGS. 9, 9B, and 10. Specifically, the keys 456 extend outwardly in the radial direction from the blade track 450. Also, the keys 356 are arranged about mid-way between the aft side 385 of the blade track 350 and the front side 384 of the blade track 350 as shown in FIGS. 9B and 10.

Figure 9A:
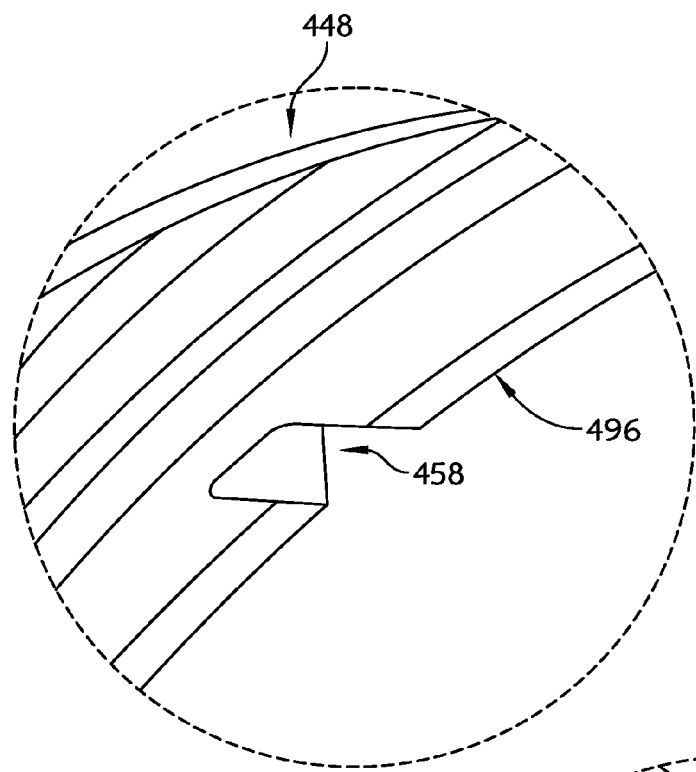
FIG. 9A is a detail perspective view of the carrier included in the turbine shroud shown in FIG. 9.
Figure 9B:
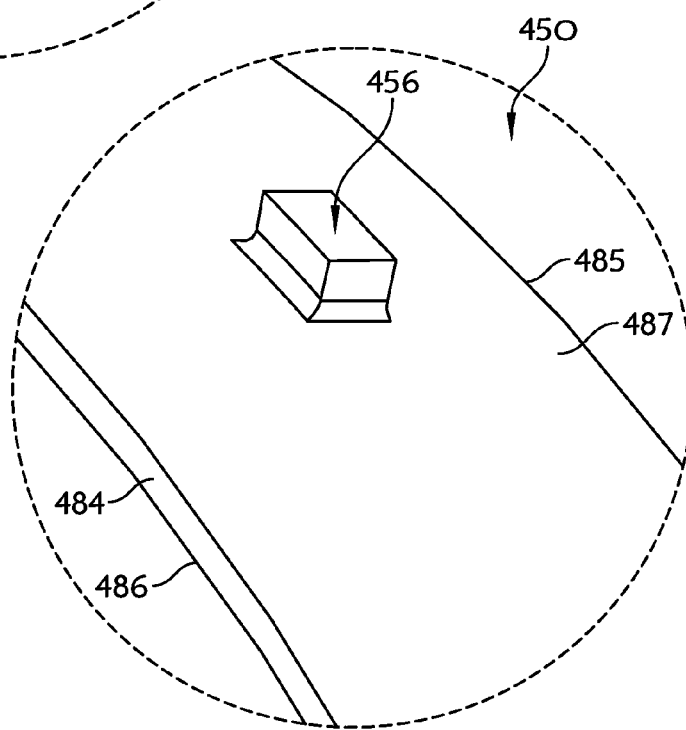
FIG. 9B is a detail perspective view of the blade track included in the turbine shroud of FIG. 9.

Further, the keyways 458 of the cross-key connection 454 are formed in the retainer 452 as shown in FIGS. 9A and 10. The keyways 358 extend outwardly in the radial direction into the carrier 448 from the inner surface 483 of the carrier 448. Additionally, the keyways 458 extend forwardly in the axial direction into a leg 496 located in the middle of the channel 480 of the carrier 448 toward the front side 481 of the carrier 448 as shown in FIG. 10. Additionally, the retainer 452 of the turbine shroud 446 has a different cross-sectional shape than the retainer 52 of the turbine shroud 46. Specifically, the retainer 452 has a C-shaped cross-section as shown in FIG. 10. Additionally, the retainer 452 does not engage the aft side 485 of the blade track 450 but rather engages an S-spring 498 that extends from the retainer 452 to the outer surface 487 of the blade track 450 to locate the blade track 45

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine shroud comprising
an annular metallic carrier,
a one-piece ceramic blade track concentric with the annular metallic carrier, and
a cross-key connection formed between the annular metallic carrier and the one-piece ceramic blade track to locate the one-piece ceramic blade track relative to the annular metallic carrier, the cross-key connection including a plurality of keys and a plurality of corresponding keyways, the plurality of keys arranged to extend in a radial direction from the annular metallic carrier, and the plurality of corresponding keyways formed to extend in the radial direction into the one-piece ceramic blade track,
wherein the plurality of keyways extend along only a portion of an axial width of the one-piece ceramic blade track such that the cross-key connection is formed over only a portion of the axial width of the one-piece ceramic blade track, wherein the one-piece ceramic blade track includes a first portion having a first thickness and a second portion having a second thickness, the second thickness greater than the first thickness, and the plurality of corresponding keyways extend inwardly in the radial direction into the second portion of the one-piece ceramic blade track without extending inwardly in the radial direction into the first portion of the one-piece ceramic blade track, and wherein the one-piece ceramic blade track includes a third portion having an increasing thickness that interconnects the first portion and the second portion, and the plurality of corresponding keyways extend inwardly in the radial direction into the third portion of the one-piece ceramic blade track.

2. The turbine shroud of claim 1, wherein the annular metallic carrier includes a connection flange adapted to be coupled to a turbine case, a connector extending inwardly in the radial direction from the connection flange and having a frustoconical shape, and a support band extending inwardly in the radial direction from the connection flange, and the plurality of keys extend inwardly in the radial direction from the support band.

3. The turbine shroud of claim 2, wherein the support band has a forward side, arranged to face a combustor of a gas turbine engine, and an aft side, arranged to face away from a combustor of a gas turbine engine, and the plurality of keys extend axially from the forward side of the support band toward the aft side of the support band.

4. The turbine shroud of claim 1, further comprising a retainer coupled to the annular metallic carrier and the one-piece ceramic blade track and arranged to engage an aft side of the annular metallic carrier and to engage an aft side of the one-piece ceramic blade track.

5. The turbine shroud of claim 1, wherein each paired key and keyway is spaced equally around the circumference of the turbine shroud by a first circumferential distance, except for a locator pair thereof that is spaced a second circumferential distance, less than the first circumferential distance, from an adjacent pair thereof to locate the one-piece ceramic blade track relative to the annular metallic carrier in a single predetermined orientation.

6. A turbine shroud comprising
a round carrier having a first coefficient of thermal expansion, a one-piece blade track nested in the round carrier and having a second coefficient of thermal expansion, the second coefficient of thermal expansion being less than the first coefficient of thermal expansion, and
a cross-key connection formed between the round carrier and the one-piece blade track to locate the one-piece blade track relative to the round carrier, the cross-key connection including a plurality of keys and a plurality of corresponding keyways, the plurality of keys arranged to extend in a radial direction from the round carrier, and the plurality of corresponding keyways formed to extend in the radial direction into the one-piece blade track, wherein the plurality of corresponding keyways extend along only a portion of an axial width of the one-piece blade track such that the cross-key connection is formed over only a portion of the axial width of the one-piece blade track, wherein the one-piece blade track includes a first portion having a first thickness, a second portion having a second thickness greater than the first thickness, and the plurality of corresponding keyways extend inwardly in the radial direction into the second portion of the one-piece blade track without extending inwardly in the radial direction into the first portion of the one-piece blade track, and wherein the one-piece blade track includes a third portion having an increasing thickness that interconnects the first portion and the second portion, and the plurality of corresponding keyways extend inwardly in the radial direction into the third portion of the one-piece blade track.

7. The turbine shroud of claim 6, wherein the plurality of keys have the first coefficient of thermal expansion.

8. The turbine shroud of claim 7, wherein the round carrier includes a connection flange adapted to be coupled to a turbine case, a connector arranged to extend inwardly in the radial direction from the connection flange and having a frustoconical shape, and a support band arranged to extend inwardly in the radial direction from the connector and connection flange, and the plurality of keys extend inwardly in the radial direction from the support band.

9. A method of locating a one-piece ceramic blade track relative to a metallic retainer, the method comprising
   rotating the one-piece ceramic blade track to a single predetermined orientation relative to the metallic retainer,
   nesting the one-piece ceramic blade track in a space formed by the metallic retainer so that the one-piece ceramic blade track is concentric with the metallic retainer, and
   inserting a plurality of keys extending in a radial direction from the metallic carrier into a corresponding plurality of keyways formed in the one-piece ceramic blade track to thereby establish a cross-key connection between the one-piece ceramic blade track and the metallic carrier,
   wherein the step of rotating the ceramic blade track to the single predetermined orientation relative to the metallic retainer includes the steps of (i) aligning at least two of the keys each spaced a first distance from a neighboring key with at least two of the keyways spaced to receive the at least two of the keys, and (ii) aligning at least one offset key spaced a second distance, different from the first distance, from a neighboring key with at least one corresponding offset keyway, wherein the at least one offset key and the at least one corresponding offset keyway are configured to only allow nesting of the one-piece ceramic blade track in the metallic retainer when the one-piece ceramic blade track is in the single predetermined orientation relative to the metallic retainer;
   wherein the offset ceramic blade track includes a first portion having a first thickness, a second portion having a second thickness greater than the first thickness, and the plurality of keyways extend inwardly in the radial direction into the second portion of the one-piece ceramic blade track without extending inwardly in the radial direction into the first portion of the one-piece ceramic blade track, and
   wherein the one-piece ceramic blade track includes a third portion having an increasing thickness that interconnects the first portion and the second portion, and the plurality of keyways extend inwardly in the radial direction into the third portion of the onepiece ceramic blade track.

10. The method of claim 9, wherein the plurality of keyways extend along only a portion of an axial width of the one-piece ceramic blade track such that the cross-key connection is formed over only a portion of the axial width of the one-piece ceramic blade track.

* * * * *